(12) United States Patent
Graf et al.

(10) Patent No.: US 6,967,223 B1
(45) Date of Patent: Nov. 22, 2005

(54) FIBER-FREE SHAPED PARTS

(75) Inventors: Robert Graf, Osterberg (DE);
Maria-Elisabeth Kaiser, Ulm (DE);
Klaus Lehr, Linngenfeld (DE);
Wolfgang Six, Frankfurt a. Main (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 0 days.

(21) Appl. No.: 09/623,115

(22) PCT Filed: Feb. 17, 1999

(86) PCT No.: PCT/EP99/01049

§ 371 (c)(1),
(2), (4) Date: Dec. 19, 2000

(87) PCT Pub. No.: WO99/43764

PCT Pub. Date: Sep. 2, 1999

(30) Foreign Application Priority Data

Feb. 26, 1998 (DE) ................................ 198 08 131
Feb. 9, 1999 (DE) ................................ 199 05 153

(51) Int. Cl.$^7$ ................................................. C08J 9/00
(52) U.S. Cl. ........................ 521/103; 521/85; 521/91; 521/92; 521/99; 521/106; 521/107; 521/108; 521/122; 521/123; 523/179; 524/442; 524/444; 524/445; 524/450; 524/495; 524/496
(58) Field of Search .............................. 521/85, 91, 92, 521/99, 103, 106, 107, 108, 122, 123; 523/179; 524/442, 444, 445, 450, 495, 496

(56) References Cited

U.S. PATENT DOCUMENTS 4,889,875 A * 12/1989 Aust et al. ................... 521/123
5,082,494 A * 1/1992 Crompton ................ 106/18.12

* cited by examiner

Primary Examiner—Edward J. Cain
(74) Attorney, Agent, or Firm—John F. Daniels; Daniel S. Ortiz

(57) ABSTRACT

A fiber-free molding composition containing: (a) a binder selected from the group consisting of an epoxide, a polyisocyanate, a furane-resin-free phenolic resin, and mixtures thereof; and (b) a filler mixture containing: (i) an inorganic high-temperature-resistant filler; and (ii) a heat-activatable swelling agent.

17 Claims, No Drawings

FIBER-FREE SHAPED PARTS

BACKGROUND OF THE INVENTION

This invention relates generally to flame-retardant materials and insulating materials and, more particularly, to fiber-free moldings containing binders and selected fillers.

Products containing mineral, ceramic and glass fibers are widely used in the field of heat and sound insulation. Large quantities of such materials—mostly in sheet or shell form—are also used for the preventive fire protection of buildings.

One of the advantages of these materials is their favorable thermal insulation capacity coupled with high mechanical strength. The materials in question are also distinguished by their easy machinability, low weight, high heat resistance and favorable self-burning behavior. Many of these "insulation materials" are classified as noninflammable building materials (Class A Building Materials according to DIN 4102, Part 1) or at least as flame-resistant building materials (Class B1 Building Materials according to DIN 4102, Part 1).

Mineral, ceramic and glass fibers are also known collectively as MMMF fibers. MMMF is the abbreviation for man-made mineral fibers. The toxicological effect of MMMF fibers is a contentious issue (see F. W. Löffler: Aktuelle Aspekte zur Problematik der künstlichen Mineralfasern, Keramik und Glas 2, 14 (1996)). Depending on their length-to-diameter ratio and their chemical composition, many of these fibers are classified as carcinogenic materials under the law on hazardous materials (see Technische Regeln für Gefahrstoffe TRGS 905 and TRGS 906). The absence of fibers is extremely important for factory hygiene and toxicological reasons because fibers are released both during processing of the moldings and also—through mechanical stressing—during their use (VDI Kolloquium "Faserförmige Stäube", 9/93).

Accordingly, there is an interest in MMMF-free products which have a similar property spectrum to the fiber-based materials mentioned above. Known MMMF-free materials are, for example, vermiculite, cellular concrete, perlite, calcium silicate and gypsum products. Thus, a highly filled phenolic resin foam is described, for example, in DE-A1 3644468 (Isobloc Hüls). In this case, aluminium hydroxide and silicon oxide are used as fillers in quantities of more than 100% by weight, based on the phenolic resin. The result of this is that the rigid foams formed are correspondingly heavy (density 350 kg/m$^3$). Another possibility is to use phenolic resins in combination with furane resins, as described in European patent application EP-A2 0 325 935 (Rühl) and in DE-C14227536 (Rühl), DE-C1 3407512 (Rühl) and DE-B1 2825295. The products described therein use as fillers the main component aluminium hydroxide and added quantities of boric acid, sodium tetraborate and cryolite which are said to retard the burning rate of the organic foam matrix. The disadvantage of these products lies inter alia in the considerable outlay involved in avoiding odor emissions during production and in adjustment of the reactivity of the resin. None of the hitherto known materials represents an ideal replacement for the fiber-containing building materials because the properties of fiber-containing products cannot all be achieved.

Accordingly, the problem addressed by the present invention was to produce fiber-free moldings which would be comparable in their property spectrum with fiber-containing materials. In particular, the replacement materials would be comparable with the fiber-containing materials in their weight, their easy processability and their simple thermoformability under pressure. In addition, the materials according to the invention would show favorable self-burning behavior so that they could be used in the preventive fire protection of buildings. Economic production would of course also be desirable.

DESCRIPTION OF THE INVENTION

The present invention relates to fiber-free moldings containing binders and fillers, characterized in that the binders are selected from the group of thermosets reacting out by addition of hardeners which consists of epoxides, polyisocyanates and furane-resin-free phenolic resins and in that solid mixtures of inorganic, high-temperature-resistant fillers and heat-activatable swelling agents are present as fillers.

The present invention also relates to fiber-free moldings containing binders and fillers, characterized in that adhesives, miropore-forming high-temperature-resistant fillers and grinding aids and/or anticaking agents are additionally present as fillers.

It has surprisingly been found that these moldings have the key positive properties of known fiber-containing moldings, such as low weight, easy machinability and thermoformability under pressure. In addition, these moldings show favorable self-burning behavior. Moreover, the factory hygiene requirements governing the handling of fiber-containing moldings are not relevant, nor are the toxicological reservations concerning fiber-containing moldings. Products which can be processed surprisingly easily were obtained in particular in the case of fiber-free moldings which contain furane-resin-free phenolic resins as binders. In their case, controlled crosslinking of the binder and odor-free production are possible. In addition, fiber-free moldings which can be produced at less cost for the same property spectrum are obtained.

Fillers

In one preferred embodiment, the filler used is a solid mixture consisting of 20 to 90% by weight of inorganic high-temperature-resistant fillers, 1 to 30% by weight of heat-activatable swelling agents, 0.1 to 35% by weight of adhesives, 2 to 40% by weight of micropore-forming high-temperature-resistant fillers, 0.01 to 10% by weight of grinding aids and/or anticaking agents, with the proviso that the quantities add up to 100% by weight.

In one particularly preferred embodiment, the filler used is a solid mixture consisting of 40 to 80% by weight of inorganic high-temperature-resistant fillers, 2 to 20% by weight of heat-activatable swelling agents, 1 to 25% by weight of adhesives, 2.5 to 30% by weight of micropore-forming high-temperature-resistant fillers, 0.1 to 5% by weight of grinding aids and/or anticaking agents, with the proviso that the quantities add up to 100% by weight.

Inorganic High-Temperature-Resistant Filers

Suitable inorganic high-temperature-resistant fillers are minerals such as, for example, calcium carbonate, calcium sulfate, clay, aluminium oxide, aluminium silicate, magnesium oxide, silica. Natural aluminium silicates, such as kaolin, mica, feldspar and mixtures thereof are preferred. These fillers are generally used in finely ground form, a mean particle size of 1 to 20 μm being particularly preferred. They are used in quantities of typically 20 to 90% by weight and preferably 40 to 80% by weight, based on the total quantity of fillers.

Heat-Activatable Swelling Agents

The heat-activatable swelling agents used are substances or mixtures which undergo an increase in volume of 2 to 100 times and more particularly 10 to 50 times at temperatures in the range from 100 to 1,000° C. and more particularly at temperatures in the range from 200 to 900° C. This expansion compensates for the loss of volume occurring through the destruction of the binder at its decomposition temperature. Accordingly, the heat-activatable swelling agents make a key contribution to the integrity of the moldings at high temperatures. Such swelling agents are, for example, native vermiculite and perlite, expanded graphite, soda and potash waterglass. Other suitable heat-activatable swelling agents are mixtures of substances which are capable of releasing phosphoric acid and/or oligophosphoric acid and/or polyphosphoric acid and which consist of carbon-containing substances containing esterifiable hydroxyl groups and substances and mixtures which are capable of releasing a noninflammable gas at elevated temperature. The last-mentioned mixtures may also be used in microencapsulated form. Mixtures of swelling agents which develop their swelling effect at different temperatures are preferably used. This is the case, for example, with a mixture of vermiculite and perlite: whereas vermiculite expands at temperatures as low as 250 to 300° C., perlite only expands at 900 to 1,000° C. The swelling agents are normally used in a particle size of 0.0001 to 8 mm and preferably in a particle size of 0.0001 to 3 mm. The heat-activatable swelling agents are used in quantities of preferably 1 to 30% by weight and more preferably 2 to 20% by weight, based on the quantity of filler.

Micropore-Forming High-Temperature-Resistant Fillers

The micropore-forming high-temperature-resistant fillers are added to produce thermostable pores in the product in addition to the pores formed during foaming of the resin compound. This is particularly important because the pores formed during foaming of the resin compound have organic thermally decomposable cell walls which are destroyed at temperatures above the decomposition point of the binder. By contrast, the high-temperature-resistant fillers added are distinguished by the fact that they form pores which are stable even at temperatures above the decomposition temperatures of the binder. Accordingly, they acquire the thermal insulatability of the moldings over broad temperature ranges up to ca. 1200° C. Suitable fillers are, for example, expanded perlite and vermiculite, expanded clay, expanded graphite, hollow aluminium silicate, glass and/or fly ash beads, porous concrete and expanded waterglass. The micropore-forming high-temperature-resistant fillers may be used as individual substances although they are preferably used in the form of mixtures. They are used in a particle size of typically 0.0001 to 10 mm and preferably 0.0001 to 2 mm. The micropore-forming high-temperature-resistant fillers are used in quantities of preferably 2 to 40% by weight and more preferably 2.5 to 30% by weight, based on the total quantity of fillers.

Adhesive

The adhesive used bonds both the inorganic heat-resistant fillers and the micropore-forming high-temperature-resistant fillers and the expandate of the heat-activatable swelling agents in the temperature ranges in which the binder no longer fulfils that function. Suitable adhesives are inorganic adhesives, more particularly high-temperature-resistant inorganic adhesives. Adhesives suitable for the relevant temperature range (above the decomposition range of the binder) are, for example, glasses, such as soda-lime glasses, phosphates, borates and mixtures thereof. Suitable phosphates are both monophosphates and oligo- and polyphosphates, more particularly melamine phosphate, melamine diphosphate, guanidine phosphate, monoammonium phosphate, diammonium phosphate, potassium triphosphate, sodium hexametaphosphate and ammonium polyphosphate. Preferred borates besides the borates of the alkali and alkaline earth metals are borates of zinc. It is preferred to use mixtures of these adhesives which develop their effect over a broad temperature range. The adhesive is normally used in finely ground form, i.e. in a particle size of 0.001 to 1,000 μm and preferably in a particle size of 0.001 to 100 μm, and in a quantity of preferably 0.1 to 35% by weight and more preferably 1 to 25% by weight, based on the total quantity of filler.

Grinding Aids and/or Anticaking Agents

Grinding aids and/or anticaking agents are used for problem-free production, storage and incorporation of the fillers used. Suitable grinding aids and anticaking agents are, for example, highly disperse silicas, more particularly pyrogenic silicas. Pyrogenic silicas are highly disperse silicas which are obtained by flame hydrolysis. Apatites and stearates, more particularly calcium and aluminium stearates, may also be used. The advantage of using stearates is that they develop an adhesive effect at low temperatures. The grinding aids and/or anticaking agents are generally added to the mixtures in finely ground form during the grinding process and/or during the mixing process. They are used in a particle size of generally 0.001 to 200 μm and preferably 0.001 to 50 μm and in quantities of preferably 0.01 to 10% by weight and more preferably 0.1 to 5% by weight, based on the total quantity of fillers.

pH Value

In one preferred embodiment, the aqueous suspension of the fillers has a pH value of or below 7.5. The advantage of this is that smaller quantities of acid can be used as hardener. The hardening process is thus quicker and more economical and the foam formed is improved in regard to cellularity, density and water content and also acid content (less residual acid in the end product).

The pH value of the fillers is determined on a 3.0% by weight aqueous suspension at 20° C.

Binders

The binders used are selected from the group of thermosets reacting out by addition of hardeners which consists of epoxides, polyisocyanates and furane-resin-free phenolic resins. It is particularly preferred to use furane-resin-free phenolic resins.

The present invention includes the observation that, where furane-resin-free phenolic resins are used, fiber-free moldings distinguished by particularly easy processability and excellent self-burning behavior are obtained.

Phenolic resins is the collective name for synthetic resins obtained by condensation of phenols with aldehydes, more particularly formaldehyde, and modified reaction products which can be derived from the basic reaction mentioned above or are produced by addition of phenols onto unsaturated compounds. As described in DIN 16916, there are various types of phenolic resins, such as unmodified phenolic resins, novolaks, resols, modified phenolic resins and phenol addition resins. In one particularly preferred embodiment of the invention, resols (synonym: phenol resol resins) are used.

The particularly preferred phenol resol resins used to produce the moldings according to the invention are resins known per se which are obtained by alkaline condensation of phenol and formaldehyde. The condensation is controlled in known manner in such a way that foamable phenol resol resins are formed. A typical embodiment is characterized by the use of a liquid phenol resol resin which is obtained by condensation of phenol with formaldehyde in a molar ratio of 1:1.35 to 1:1.9, preferably 1:1.4 to 1:1.7 and more preferably 1:1.5 using alkali metal and/or alkaline earth metals as catalysts. Alkali metals, especially aqueous sodium hydroxide solutions, are preferably used. The catalyst is used in a quantity of generally 0.7 to 1.5% by weight and preferably 0.9 to 1.3% by weight, based on the phenol weighed in. The viscosity of the phenol resol resin is generally in the range from 300 to 8,000 mPas and preferably in the range from 400 to 3,000 mPas, as determined with a Höppler falling ball viscosimeter at 20° C. The pH value is normally in the range from 7.0 to 9.0 and preferably in the range from 8.3 to 8.7. The resol resin is free from furane compounds.

The binder is used in quantities of preferably 20 to 80% by weight and more preferably 20 to 60% by weight.

Hardeners

Typical hardeners for the above-mentioned binders are amines, amidoamines, anhydrides, acids and polyols. Strong inorganic and/or organic acids are generally used to harden the phenolic resins preferably used. Acids normally used are hydrochloric acid, phosphoric acid, p-toluenesulfonic acid, xylenesufonic acid and phenolsulfonic acid. The oxy acids of phosphorus and sulfur, such as phosphoric acid and sulfuric acid, are preferred. Sulfuric acid is particularly preferred. If the molding is intended to be halogen-free, this should be taken into account in the choice of the acid. The hardener is used in a quantity of generally 0.1 to 20% by weight and more particularly 0.5 to 12% by weight.

The present invention also relates to the fiber-free moldings claimed in claim 1 which contain emulsifiers and blowing agents as further components. In one preferred embodiment, the fiber-free moldings are obtained by reaction of
10 to 79.7% by weight of binder,
0.1 to 20% by weight of hardeners,
0.01 to 5% by weight of emulsifiers,
0.1 to 10% by weight of blowing agents,
20 to 70% by weight of fillers,
with the proviso that the quantities add up to 100% by weight.

In one particularly preferred embodiment, the fiber-free moldings are obtained by reaction of
20 to 60% by weight of binder,
0.5 to 12% by weight of hardeners,
0.1 to 2% by weight of emulsifiers,
0.5 to 5% by weight of blowing agents,
25 to 50% by weight of fillers,
with the proviso that the quantities add up to 100% by weight.

The ratio by weight of resin to filler in the final molding can be influenced by the choice of the quantities used, their water content and the production process. In one particularly preferred embodiment, the fiber-free moldings are characterized by a ratio by weight of resin to filler of 1:5.0 to 1:0.1, preferably 1:2.5 to 1:0.3, more preferably 1:2.0 to 1:0.5 and most preferably 1:1.0 to 1:0.5.

Blowing agents

Suitable blowing agents are substances which give off gases under the influence of the other mixture components, such as carbonates, hydrogen carbonates and ammonium compounds. Low-boiling hydrocarbons such as, for example, pentane, cyclopentane, acetone, petroleum ether, methanol, hexane or mixtures of these hydrocarbons which boil between 40 and 90° C. are also suitable. Halogenated hydrocarbons which boil in that temperature range may also be used as blowing agents. These blowing agents may develop their blowing effect either under the effect of an external heat source or under the effect of the exothermic reaction of binder and hardener. Other suitable blowing agents are microencapsulated acidic or alkaline liquids of which the membrane is destroyed by mechanical or chemical action in the production process and which then react with the fillers with evolution of gas. The blowing agents are used in quantities of generally 0.1 to 10% by weight and preferably 0.5 to 5% by weight.

Emulsifiers

The emulsifier is needed to enable nonpolar blowing agents used and the fillers to be uniformly incorporated in the binder. Suitable emulsifiers are ionic, nonionic or amphoteric compounds which enable the blowing agents to be finely dispersed and/or the fillers to be completely wetted and hence more quickly incorporated. Alkyl polyglycosides and fatty acid derivatives, such as fatty acid amides, fatty acid imides, fatty acid amidoalkyl betaines and/or fatty acid ethoxylates and fatty acid propoxylates, are preferred. It is particularly preferred to use fatty acid ethoxylates, such as oleic acid ethoxylates or castor oil ethoxylates with 2 to 20 moles ethylene oxide. The use of castor oil ethoxylates with 15 to 20 moles of ethylene oxide is most particularly preferred. In another embodiment, ether sulfates are used as emulsifiers, fatty acid ether sulfates—especially sodium lauryl ether sulfate—being particularly preferred. The emulsifiers may be used both individually and in the form of mixtures in quantities of normally 0.01 to 5% by weight and preferably 0.1 to 2% by weight.

Production

The foaming of the binder with the filler is carried out in known manner. To this end, the binder is thoroughly mixed with the emulsifier. The filler mixture is then added. The blowing agent and then the hardener are added with intensive stirring. The individual components have to be carefully mixed to obtain a uniform foam (with no voids). After the hardener has been incorporated, the resin compound is transferred to a foaming mold. This foaming mold is generally heated, normally to temperatures of 40 to 60° C. The hardening time depends on the geometry of the mold, the reactivity of the resin used, the acid used and the quantity and properties of the fillers and on the mold temperature. Typical foam forms are panels although other forms (blocks, pipe sheaths, half-shells, etc.) may also be used.

Density

The present invention also relates to the density of the fiber-free moldings which is generally in the range from 100 to 300 kg/m$^3$, preferably in the range from 150 to 220 kg/m$^3$ and more preferably in the range from 180 to 200 kg/m$^3$.

Another advantage of the present invention is the interplay between binder—particularly the phenolic resin—and adhesive. Whereas the binder provides for the stability of the moldings at temperatures below the decomposition point of the binder, the adhesive is responsible for that function at temperatures above the decomposition point of the binder. In one preferred embodiment, the heat-activatable high-temperature-resistant swelling agents and the micropore-forming high-temperature-resistant fillers additionally provide for stability at those temperatures. The stability and/or integrity of the moldings over a broad temperature range is thus guaranteed.

The present invention also relates to the use of the fiber-free moldings as fire retardant and/or insulating moldings.

The present invention also relates to the use of the fiber-free moldings as composites. Possible composite materials are, for example, wood, metal and/or plastics. Typical forms, for example sheets, shells, half-pipes, etc., are again possible.

Commercial Applications

The fiber-free moldings according to the invention are at least equivalent in their properties to known fiber-containing moldings. Particular advantages are their easy machinability and thermoformability under pressure. In addition, the factory hygiene requirements governing the handling of fiber-containing moldings are not relevant, nor are the toxicological reservations concerning fiber-containing moldings. Fiber-containing moldings can thus be replaced in virtually all fields of application. The fiber-free moldings according to the invention are particularly suitable for the production of fire-retardant moldings and insulating moldings. They can be produced in any shapes known per se, such as sheets, shells, half-pipes, etc.

EXAMPLES

Example 1a

52% by weight of a phenol resol resin (molar ratio of phenol to formaldehyde 1:1.5; catalyst: 0.95% by weight aqueous sodium hydroxide solution, based on the phenol weighed in, 1,800–2,000 mPas) with a dry matter content of 75% by weight were introduced into a stirred vessel. 0.8% by weight of a sodium lauryl ether sulfate was added with stirring. After homogenization, 36% by weight of a filler mixture (see Table 1) were gradually added with stirring so that a viscous resin compound was formed. 1.5% by weight of pentane were added to this resin compound with continued intensive mixing. Finally, after complete homogenization, 9.7% by weight of a 45% by weight aqueous sulfuric acid solution were added. The homogenized mixture was poured into a steel mold preheated to 60° C., the quantity of compound weighed in relative to the volume of the mold being selected so that the end product had a density of 180 kg/m$^3$. After the compound had been introduced, the mold was closed. The reaction time of the mixture was about 4 hours. After cooling of the mold, the hardened foam block was removed and cut into shaped pieces.

Example 1b

Example 1a was repeated using the following phenol resol resin: molar ratio of phenol to formaldehyde 1:1.4; catalyst 1.1% by weight aqueous sodium hydroxide solution, 7,400 mPas.

Example 1c

Example 1a was repeated using the following phenol resol resin: molar ratio of phenol to formaldehyde 1:1.6; catalyst 1.3% by weight aqueous sodium hydroxide solution, 5,500 mPas.

Example 1d

Example 1a was repeated using the following phenol resol resin: molar ratio of phenol to formaldehyde 1:1.7; catalyst 1.1% by weight aqueous sodium hydroxide solution, 500 mPas.

TABLE 1 filler mixture for Examples 1a, 1b, 1c and 1d

| Function | Component | % by weight[1] | Mean particle size [$\mu$m] |
|---|---|---|---|
| Inorganic high-temperature-resistant filler | Kaolin | 75.4 | 3 |
| Heat-activatable swelling agent | Native vermiculite | 9.8 | 0.001–3000 |
| Adhesive | Melamine phosphate | 2.4 | 20 |
|  | Zinc borate | 2.4 | 5 |
| Micropore former High-temperature resistant filler | Hollow glass beads | 9.8 | 0.001–100 |
| Grinding aid and/or anti-caking agent | Calcium stearate | 0.2 | 10 |

[1]Quantities in % by weight, based on total quantity of filler

Example 2a

58% by weight of a phenol resol resin (molar ratio of phenol to formaldehye 1:1.5; catalyst: 0.95% by weight aqueous sodium hydroxide solution, based on the phenol weighed in, 1,800–2,000 mPas) with a dry matter content of 70% by weight were introduced into a stirred vessel. 0.6% by weight of a castor oil ethoxylate+20 moles ethylene oxide were added with stirring. After homogenization, 32% by weight of a filler mixture (see Table 2) were gradually added with stirring so that a viscous resin compound was formed. 1.8% by weight of pentane were added to this resin compound with continued intensive mixing. Finally, after complete homogenization, 7.6% by weight of a 50% by weight aqueous sulfuric acid solution were added. The homogenized mixture was poured into a steel mold preheated to 55° C., the quantity of compound weighed in relative to the volume of the mold being selected so that the end product had a density of 200 kg/m$^3$. After the compound had been introduced, the mold was closed. After a reaction time of 5 hours and subsequent cooling of the mold, the hardened foam block was removed and cut into shaped pieces.

Example 2b

Example 2a was repeated using the following phenol resol resin: molar ratio of phenol to formaldehyde 1:1.4; catalyst 1.1% by weight aqueous sodium hydroxide solution, 7,400 mPas.

Example 2c

Example 2a was repeated using the following phenol resol resin: molar ratio of phenol to formaldehyde 1:1.6; catalyst 1.3% by weight aqueous sodium hydroxide solution, 5,500 mPas.

Example 2d

Example 2a was repeated using the following phenol resol resin: molar ratio of phenol to formaldehyde 1:1.7; catalyst 1.1% by weight aqueous sodium hydroxide solution, 500 mPas.

TABLE 2 filler mixture for Examples 2a, 2b, 2c and 2d

| Function | Component | % by weight[1] | Mean particle size [μm] |
|---|---|---|---|
| Inorganic high-temperature-resistant filler | Kaolin | 40 | 3 |
|  | Mica | 30 | 0–50 |
| Heat-activatable swelling agent | Expanded graphite | 8.8 | 0–2000 |
|  | Native vermiculite | 1.5 | 0–3000 |
|  | Native perlite | 1.5 | 0–3000 |
| Adhesive | Melamine phosphate | 3.0 | 0–100 |
|  | Ammonium polyphosphate | 3.0 | 0–100 |
| Micropore former | Expanded perlite | 6.0 | 0–3000 |
| High-temperature resistant filler | Expanded vermiculite | 3.0 | 0–4000 |
|  | Hollow fly ash beads | 3.0 | 0–1000 |
| Grinding aid and/or anticaking agent | Pyrogenic silica | 0.2 | 0–50 |

[1]Quantities in % by weight, based on total quantity of filler

Example 3a 54.8% by weight of a phenol resol resin (molar ratio of phenol to formaldehye 1:1.5; catalyst: 0.95% by weight aqueous sodium hydroxide solution, based on the phenol weighed in, 1,800–2,000 mPas) with a dry matter content of 70% by weight were introduced into a stirred vessel. 0.6% by weight of a castor oil ethoxylate+20 moles ethylene oxide were added with stirring. After homogenization, 36.2% by weight of a filler mixture (see Table 3) were gradually added with stirring so that a viscous resin compound was formed. 1.2% by weight of pentane were added to this resin compound with continued intensive mixing. Finally, after complete homogenization, 7.2% by weight of a 50% by weight aqueous sulfuric acid solution were added. The homogenized mixture was poured into a steel mold preheated to 55° C., the quantity of compound weighed in relative to the volume of the mold being selected so that the end product had a density of 200 kg/m$^3$. After the compound had been introduced, the mold was closed. After a reaction time of 5 hours and subsequent cooling of the mold, the hardened foam block was removed and cut into shaped pieces.

Example 3b

Example 3a was repeated using the following phenol resol resin: molar ratio of phenol to formaldehyde 1:1.4; catalyst 1.1% by weight aqueous sodium hydroxide solution, 7,400 mPas.

Example 3c

Example 3a was repeated using the following phenol resol resin: molar ratio of phenol to formaldehyde 1:1.6; catalyst 1.3% by weight aqueous sodium hydroxide solution, 5,500 mPas.

Example 3d

Example 3a was repeated using the following phenol resol resin: molar ratio of phenol to formaldehyde 1:1.7; catalyst 1.1% by weight aqueous sodium hydroxide solution, 500 mPas.

Assuming that the average water content in the resin is 13.0%, the ratio by weight of resin to filler for the moldings obtained in accordance with Examples 3a to d is 1:0.8.

TABLE 3 filler mixture for Examples 3a, 3b, 3c and 3d

| Function | Component | % by weight[1] | Mean particle size [μm] |
|---|---|---|---|
| Inorganic high-temperature-resistant filler | Kaolin | 75.4 | 3 |
| Heat-activatable swelling agent | Expanded graphite | 9.7 | 0.001–2000 |
| Adhesive | Ammonium polyphoshate | 5.0 | 0.001–100 |
| Micropore former | Hollow aluminium silicate beads | 9.4 | 0.001–2000 |
| High-temperature resistant filler |  |  |  |
| Grinding aid and/or anti-caking agent | Precipitated silica | 0.5 | 0.001–50 |

[1]Quantities in % by weight, based on total quantity of filler

Fire-Retardant Properties and Machinability 6 cm thick panels were cut from the foam blocks of Examples 1, 2 and 3 (a to d) and subjected to a small-scale burning test to DIN 4012. Fire resistance of more than 90 minutes was obtained in every case. The panels combined good mechanical strength with easy machinability with cutting tools.

What is claimed is:

1. A fiber-free molding composition comprising:
    (a) a binder selected from the group consisting of an epoxide, a polyisocyanate, a furane-resin-free phenolic resin, and mixtures thereof; and
    (b) a filler mixture containing:
        (i) from about 20 to 90% by weight, based on the weight of the filler mixture, of an inorganic high-temperature-resistant filler;
        (ii) a heat activatable swelling agent;
        (iii) an adhesive; and
        (iv) a micropore-forming, high-temperature-resistant filler.

2. The composition of claim 1 wherein the filler mixture further comprises:
    (iii) an adhesive;
    (iv) a micropore-forming, high-temperature-resistant filler; and
    (v) a grinding and/or anticaking agent.

3. The composition of claim 1 wherein the filler mixture has a pH of up to 7.5.

4. The composition of claim 2 wherein the filler mixture contains;
    (i) from 20 to 90% by weight of the inorganic high-temperature-resistant filler;
    (ii) from 1 to 30% by weight of the heat-activatable swelling agent;
    (iii) from 0.1 to 35% by weight of the adhesive;
    (iv) from 2 to 40% by weight of the micropore-forming, high-temperature-resistant filler; and
    (v) from 0.01 to 10% by weight of the grinding and/or anticaking agent, all weights being based on the total weight of the molding.

5. The composition of claim 1 further comprising a hardener.

6. The composition of claim 1 further comprising a blowing agent.

7. The composition of claim 1 wherein the molding has a density of from 100 to 300 kg/m$^3$.

8. A process for making a fiber-free molding composition comprising:
(a) providing a binder selected from the group consisting of an epoxide, a polyisocyanate, a furane-resin-free phenolic resin, and mixtures thereof;
(b) providing a thermosetting hardener;
(c) providing a filler mixture containing:
  (i) an inorganic high-temperature-resistant filler;
  (ii) a heat-activatablle swelling agent;
  (iii) an adhesive;
  (iv) a micropore-forming, high-temperature-resistant filler; and
  (v) a grinding and/or anticaking agent; and
(d) combining (a)–(c) to form the fiber-free molding composition.

9. The process of claim 8 further comprising mixing an emulsifier with the binder.

10. The process of claim 8 further comprising providing a blowing agent.

11. The process of claim 8 wherein the filler mixture has a pH of up to 7.5.

12. The process of claim 8 further comprising introducing the molding mixture into a mold to form a solid, fiber-free foam form.

13. The product of the process of claim 8.

14. The product of the process of claim 9.

15. The product of the process of claim 10.

16. The product of the process of claim 11.

17. The product of the process of claim 12.

* * * * *